(12) United States Patent
Bouziane et al.

(10) Patent No.: US 7,048,831 B2
(45) Date of Patent: May 23, 2006

(54) ANOXIC REACTION APPARATUS AND PROCESS FOR OBTAINING AN ANOXIC REACTION THEREIN

(76) Inventors: Richard Bouziane, 1630, De Brulé, St-Antoine sur Richelieu, Québec (CA) J0L 1R0; Gilles Tremblay, 340, Surprenant, Ville Ste-Catherine, Québec (CA) J0L 1E0

(*) Notice: Subject to any disclaimer, the term of this patent is extended or adjusted under 35 U.S.C. 154(b) by 554 days.

(21) Appl. No.: 10/162,651

(22) Filed: Jun. 6, 2002

(65) Prior Publication Data
US 2003/0009067 A1    Jan. 9, 2003

(30) Foreign Application Priority Data
Jun. 7, 2001    (CA) .................................... 2350634

(51) Int. Cl.
*C10B 57/04* (2006.01)
(52) U.S. Cl. .................. 201/20; 585/241; 585/951
(58) Field of Classification Search ............... 201/20; 585/241, 951
See application file for complete search history.

(56) References Cited

U.S. PATENT DOCUMENTS

| | | | |
|---|---|---|---|
| 1,335,926 A | 4/1920 | Twiss | |
| 3,852,038 A * | 12/1974 | Corson | 422/150 |
| 4,301,750 A | 11/1981 | Fio Rito et al. | |
| 5,820,736 A | 10/1998 | Bouziane et al. | |
| 5,821,396 A | 10/1998 | Bouziane | |

FOREIGN PATENT DOCUMENTS

| | | |
|---|---|---|
| CN | 2085638 U | 10/1991 |
| EP | 0 904 716 | 3/1999 |

* cited by examiner

Primary Examiner—Walter D. Griffin
(74) Attorney, Agent, or Firm—Ronald S. Kosie

(57) ABSTRACT

The present application discloses a method and apparatus for purging oxygen from a sealed container interior and a purge substance used in such method. The method is exemplified herein in an improved batch process and apparatus for the thermal decomposition of hydrocarbon containing material in a sealed reactor interior. According to the present invention the improved batch process may comprise, 1) loading the hydrocarbon containing material into and sealing the reactor, 2) purging or expelling oxygen from said reactor, and 3) heating said reactor to a predetermined temperature so as to obtain decomposition products, the improvement residing in the purging step including loading the reactor with an oxyphilic solution prior to sealing and heating the interior of the sealed reactor to a predetermined temperature to induce the oxyphilic solution to drive oxygen out of the interior of the container through said gas evacuation component. The purge substance may be for example, an oxyphilic solution as described herein. Using the method of the present invention, material such as rubber, vinyl-polymers, styrene-polymers, ethylene-polymers, synthetic fibers, domestic waste, biomedical waste, animal waste and vegetation or any other type of hydrocarbon containing material and mixtures thereof may be efficiently processed.

22 Claims, 1 Drawing Sheet

US 7,048,831 B2

ANOXIC REACTION APPARATUS AND PROCESS FOR OBTAINING AN ANOXIC REACTION THEREIN

FIELD OF THE INVENTION

The present invention relates to a new method for purging oxygen from a sealed container interior and a purge substance for accomplishing it. The present application more particularly discloses a process for the decomposition of hydrocarbon containing material exploiting the method described herein.

BACKGROUND OF THE INVENTION

The thermal decomposition of hydrocarbon containing material (i.e., pyrolysis) has been widely discussed. Both continuous and batch processes have been proposed and most of the processes described in the literature require an oxygen-free environment due to the high temperatures at which the process is performed.

Prior art, such as U.S. Pat. No. 4,301,750 (Fio Rito; November, 1981), the entire content of which is incorporated herein by reference, discuss continuous processes performed under a substantially oxygen-free environment. The main problem with such processes and apparatus is that seals are never totally reliable. Indeed, since continuous process requires continuous feed of material from the outside into the reactor, specific dynamic seals must be provided. Considering the important consequences of outside air leakage into the reactor chamber, it is considered an unacceptable risk to undertake thermal decomposition operations by use of a continuous process. Batch processes and apparatus such as, for example, the one disclosed in U.S. Pat. No. 5,821,396 (Bouzianne, R.; October, 1998) and U.S. Pat. No. 5,820,736 (Bouzianne, R. and R., Michaud; October, 1998), the entire content of which are incorporated herein by reference, are preferably used.

Processes for the thermal decomposition of material performed at elevated temperature, either continuous or batch processes require a substantially oxygen-free (i.e., anoxic) environment inside the reactor chamber (i.e., drum). The anoxic environment is essential since an oxygen ($O_2$) leakage inside the apparatus (e.g., drum, reactor chamber) is likely to result in a violent explosion. This risk can be especially appreciated when considering that the thermal decomposition and cracking reactions are usually occurring in the temperature range of, for example, between 225° C. and 510° C. Thus, air (containing oxygen), has to be removed from the inside of the reactor chamber. Many apparatus and process rely on the use of a vacuum pump(s) to remove air from inside the reactor chamber. However, even if a complete vacuum inside the apparatus (e.g., drum, reactor chamber) is usually not a prerequisite, a substantially oxygen-free environment is required.

As it is the case for many prior art apparatus, the sealed reactor chamber of the batch process disclosed in U.S. Pat. No. 5,820,736 (Bouzianne, R. and R., Michaud; October, 1998) requires an almost complete vacuum to be created inside the drum reactor chamber to remove oxygen from therein. For this purpose, expensive vacuum pumps and seals are needed. Thus, creating a vacuum inside a reactor chamber is an expensive step.

It would be advantageous to have an improved method of (for) removing oxygen from a sealed closed space. Such improved method may be performed by way of a substance purge using a purge substance and more particularly an oxyphilic solution as described herein. The batch process described herein would then be advantageously achieved without the use of expensive vacuum pump and seals. Instead, a purge substance such as, for example, an oxyphilic solution may be loaded into a reactor and following sealing and heating of the reactor's interior to a predetermined temperature, the purge substance may allow the oxygen to be driven out of the interior of the container through a gas evacuation component. Unless otherwise indicated, percentages (%) are expressed on a basis of volume/volume (v/v).

SUMMARY OF THE INVENTION

In a first aspect, the present invention provides a method for purging or expelling oxygen (i.e., performing a substance purge) from a sealed container interior, the container (e.g., reactor) being associated with a gas evacuation component, said method comprising heating the interior of the container containing a purge substance to a predetermined temperature to induce the purge substance to drive oxygen out of the interior of the container through said gas evacuation component.

In accordance with the present invention, the method of purging of oxygen (i.e., substance purge) may be performed by using a purge substance which may be selected from the group consisting of solid and liquid purge substance and mixture thereof, (e.g., water or an oxyphilic solution as described herein). It is to be understood herein, that a "purge substance" may also be any liquid (e.g., water) or solid that may be transformed into a gas (i.e., vapor) under suitable conditions (e.g., following heating) for displacing oxygen from a sealed container through a (gas) evacuation component. The amount of said purge substance, should be sufficient enough to produce a volume of gas (vapor) that will allow the generation of a substantially oxygen-free environment in a container (reactor) of a desired dimension.

Also in accordance with the present invention, the predetermined temperature may correspond, for example, to a temperature at which said purge substance becomes a gas.

In a further aspect, the present invention relates to a batch process for the thermal decomposition of a hydrocarbon containing material in a sealed reactor interior, said reactor being provided with a gas evacuation component, said process comprising the steps of:

a) loading the hydrocarbon containing material into and sealing the reactor;
b) purging or expelling oxygen from said reactor; and
c) heating said reactor to a predetermined temperature so as to obtain decomposition products, the improvement wherein the purging step includes loading the reactor with a purge substance prior to sealing the reactor and heating the interior of the sealed reactor to a first predetermined temperature to induce the purge substance to drive oxygen out of the interior of the container through said gas evacuation component.

In accordance with the present invention, the process may include recovering said decomposition product, e.g., gas, condensed vapor (containing water and/or alcohol and/or hydrocarbons having 6 or 7 carbon atoms and mixtures thereof), oil, carbon black and steel.

In a further particular aspect, the present invention provides a method for purging or expelling oxygen (for example, performing a substance purge) from a sealed container (e.g., a batch reactor) interior, the container being associated with a gas evacuation component, said method comprising heating the interior of the container containing an oxyphilic solution to a predetermined temperature to induce the oxyphilic solution to drive oxygen out of the interior of the container through said gas evacuation component.

In accordance with the, present invention, the method described herein may further comprise the step of collecting gas that are evacuated through said gas evacuation component.

In accordance with the present invention the predetermined temperature may be comprised for example between 100° C. and 225° C., when the method described herein is used in the thermal decomposition of tires.

In an additional aspect, the present invention relates to an improved batch process for the thermal decomposition of a hydrocarbon containing material in a sealed reactor interior, said reactor being provided with a gas evacuation component, said process comprising the steps of:
   a) loading the hydrocarbon containing material into and sealing the reactor;
   b) purging or expelling oxygen from said reactor; and
   c) heating said reactor to a predetermined temperature so as to obtain decomposition products, the improvement wherein the purging step includes loading the reactor with an oxyphilic solution prior to sealing the reactor and heating the interior of the sealed reactor to a first predetermined temperature to induce the oxyphilic solution to drive oxygen out of the interior of the container through said gas evacuation component.

In accordance with the present invention, the process may also include recovering said decomposition product.

In accordance with the present invention the predetermined temperature may be comprised for example between 100° C. and 225° C., when the improved batch process described herein is used for the thermal decomposition of tires.

In accordance with the present invention, the method may further comprise the step of collecting gas (including water vapor) that are evacuated through an evacuation component. This may be performed while the pressure inside said closed space (i.e., the reactor) is regulated, for example, to a substantially constant pressure; whereby a substantially anoxic environment is obtained.

In accordance with the present invention, the oxyphilic solution may comprise, for example, a proportion of approximately 10 moles of water ($H_2O$) and approximately 4 moles of an alcohol selected from the group consisting of ethanol, isopropanol, n-butanol, and isobutanol, any other water-miscible alcohol and mixtures thereof, for each 4 moles of gaseous oxygen ($O_2$) present in said reactor. The oxyphilic solution may further comprise 20% (v/v) or less (0 to 20% of the total volume) of a small chain hydrocarbon selected from the group consisting of a hydrocarbon having 6 and 7 carbon atoms (e.g., hexane, heptane, 2,3-dimethylbutane, etc.) and mixtures thereof, and 2% (v/v) or less (0 to 2% of the total volume) by volume of nonionic surfactant such as polyethylene-(20)-sorbitan-monooleate (Tween® 80) or other type of nonionic surfactant such as alcohol ethoxylate, alkylphenol ethoxylate, fatty acid ethanolamine, ethylene oxide, propylene oxide block copolymer, fatty amine ethoxylate, fatty acid ethoxylate, fatty acid sorbitol ester, fatty acid sorbitol ester ethoxylate and mixtures thereof. Percentages (%) are expressed herein as volume per volume (v/v).

Also in accordance with the present invention the oxyphilic solution may comprise, for example;

a) water, in a proportion of, for example, between 50 to 60% (v/v) of the total volume;
   b) an alcohol selected from the group consisting of ethanol, isopropanol, n-butanol, and isobutanol, and mixtures thereof in a proportion of, for example, between 30 to 40% (v/v) of the total volume;
   c) a small chain hydrocarbon selected from the group consisting of hydrocarbons having 6, and 7 carbon atoms, and mixtures thereof in a proportion of, for example, between 0 to 20% (v/v) of the total volume and;
   d) a nonionic surfactant selected from the group consisting of Tween® 80, and other nonionic surfactant such as, for example, alcohol ethoxylate, alkylphenol ethoxylate, fatty acid ethanolamine, ethylene oxide propylene oxide block copolymer, fatty amine ethoxylate, fatty acid ethoxylate, fatty acid sorbitol ester, fatty acid sorbitol ester ethoxylate in a proportion of between 0 to 2% (v/v) of the total volume.

Further in accordance with the present invention, the oxyphilic solution described herein may be prepared from its separated components mixed prior (premixed) to their addition inside the reactor chamber. However, the (separated) components may be added directly to the reactor chamber prior to mixing. Mixing may occur during the process while the reactor is rotatably agitated (spun). In accordance with the present invention, the oxyphilic solution may be introduced into the reactor before sealing and once the reactor is sealed (in an airtight manner), the interior of the container may be heated (e.g. about 100° C.) to generate an oxygen-free environment. The reactor may further be heated by means of burners until an exothermic reaction occurs from material (e.g. rubber, tire (vehicle tires (new or used))) undergoing decomposition. The reaction (heating) may be continued (e.g., up to 435° C. or even up to 510° C.) until the desired products (e.g., carbon black, oil) are generated.

The generation of a substantially oxygen-free environment using a purge substance such as the oxyphilic solution described herein, may be initiated at low temperature (e.g. 100° C. or slightly higher, e.g., helping the vaporization of the oxyphilic solution). The vaporizing stage of the purge substance (e.g., oxyphylic solution) may then create a positive pressure due to the volume of vapor increasing drastically, which draws air (oxygen) from the drum (out of the drum).

At higher temperature (e.g., more than 225° C., i.e., when rubber is decomposing), an exothermic reaction occurs, due to the thermal decomposition of material (cracking of long chain molecules). Once the exothermic reaction takes place, the temperature and the pressure inside the drum may be allowed to rise within a continuous anoxic environment. The pressure may be maintained above atmospheric at all times and may thereafter be regulated preferably between 1 and 35 PSIG.

In accordance with the present invention, the material used in the process described herein may be a material containing hydrocarbons, which requires the use of an anoxic atmosphere in order to be decomposed in safe conditions. Accordingly, the material containing hydrocarbons may be selected from the group consisting of a tire (new tires that are rejected or discarded for imperfection or inventory surplus and/or used (vehicle) tires), a rubber material, a vinyl-polymer, a styrene-polymer, an ethylene-polymer, a synthetic fiber, a domestic waste (garbage (e.g., fruit and vegetable peel, paper, textile, plastic)), an animal waste (e.g., mammal, insect, fish, reptile) including body parts and manure, a biomedical waste (e.g., body parts, organs, tissue), a vegetation (e.g., leaf, grass, wood, seaweed), and mixtures thereof. In fact, the batch process described herein may be applied to any type of material containing hydrocarbon and mixtures thereof.

In yet a further aspect, the present method relates to an apparatus (as shown in FIG. 1) for the thermal decomposition of hydrocarbon containing material said apparatus comprising;

a) a closable (i.e., sealable) reactor chamber (drum) or other container which is preferably rotatable along a longitudinal axis, b) a filter (filter elements; OMNIfilter® type) coaxial with said reactor chamber is extending inside the reactor chamber of drum, parallel to coarse filter wall and back wall defining a rear sub-chamber and a front sub-chamber, c) evacuation component (means), located in said rear sub-chamber, d) a closable opening, allowing access into said front sub-chamber, e) a door, for closing said opening in an airtight manner, and;

f) heating means, for heating said reactor chamber, wherein said apparatus is able to securely process hydrocarbon containing material to a temperature of up to 510° C. (even up to 540° C.) and wherein said apparatus does not comprise a vacuum pump.

In yet a further aspect, the present invention provides an improved apparatus for a batch process used in the thermal decomposition of hydrocarbon containing material, wherein said apparatus does not comprise a vacuum pump. More particularly, air (oxygen) removal from the inside of the apparatus (drum, reactor chamber) is not performed by the use of a vacuum pump.

The apparatus used for the thermal decomposition of material containing hydrocarbons, may comprise, for example, a rotary reactor or stationary column, drive means for rotating said reactor (along a longitudinal axis), an access to load and unload material which may be closed by a door in an air-tight manner (i.e., sealed-closed). The reactor may be surrounded by a heat-insulated sheath and may be provided with burners to heat material (i.e., reactor, drum) and may further comprise pipes (i.e., evacuation component) to evacuate gas produced by the process. A system of filter elements is extending inside said reactor defining a front sub-chamber and a rear sub-chamber and may further contain a gas collecting means connected to a discharge means. Pumps may be provided to help evacuate and circulate gas. Condenser, separator and collecting tanks may also be part of the apparatus. The rotary reactor may have inner dimensions approximately as follows: diameter of eight feet, and length of twenty feet. The reactor is preferably rotatably installed inside an insulating sheath, supported on the ground and does not comprise a vacuum pump.

The present application discloses a method and apparatus for purging oxygen from a sealed container interior and a purge substance used in such method. The method is exemplified herein in an improved batch process and apparatus for the thermal decomposition of hydrocarbon containing material in a sealed reactor interior. According to the present invention the improved batch process may comprise, 1) loading the hydrocarbon containing material into and sealing the reactor, 2) purging or expelling oxygen from said reactor, and 3) heating said reactor to a predetermined temperature so as to obtain decomposition products, the improvement residing in the purging step including loading the reactor with an oxyphilic solution prior to sealing and heating the interior of the sealed reactor to a predetermined temperature to induce the oxyphilic solution to drive oxygen out of the interior of the container through said gas evacuation component. The purge substance may be for example, an oxyphilic solution as described herein. When, for example, this process is used for the thermal decomposition of tires, gases and oil may be produced along with recyclable carbon black and steel residues which remain in the reactor at the end of the decomposition stage. The oxyphilic solution, when vaporized, creates a pressure rise that may help the vapor and air containing oxygen to be evacuated from the reactor, through evacuation means. As described herein, the oxyphilic solution may be reused from batch to batch and may comprise small chain hydrocarbons (hydrocarbons having 6 or 7 carbon atoms (C6 or C7)) in addition to water and alcohol. Surfactant may also be added as a coupling agent. Using the method of the present invention, material such as rubber, vinyl-polymers, styrene-polymers, ethylene-polymers, synthetic fibers, domestic waste, biomedical waste, animal waste and vegetation or any other type of hydrocarbon containing material and mixtures thereof may be efficiently processed.

The batch process may be accomplished with successive batches of material to be decomposed. For example, a first batch of material and the substance (e.g., oxyphilic solution) are loaded (injected) into the drum and the decomposition operation is initiated. During the process, gas are recuperated through collecting means. Once the process is completed, the drum is opened, remaining solid residues (e.g., carbon black, steel) unloaded and the drum is ready to receive the next batch and so on. As it will be described in details below, the vapor is condensed and the liquid (solution) may be recycled to generate the oxyphilic solution for the following batch process.

The method of the present invention may be exemplified with an apparatus and a batch process for decomposing material (please see Example 2). The process may be accomplished in a sealed closed space wherein the substantially oxygen-free environment has been created without the use of a vacuum pump. It is to be understood that the present invention is not limited to pyrolysis or thermal decomposition process; it is rather a new technique in which batch processes may be accomplished, in an original and innovative fashion. The invention can yet be even less restrictive, in that it may be applied to any process requiring the removal (expelling) of oxygen from a closed space provided with an evacuation component (e.g., petrochemical industry equipment for thermal cracking). However, for the purposes of this application and for clarity of the description, the invention will describe, by way of examples, a batch process for the thermal decomposition of hydrocarbon containing material (e.g., rubber tires), and the apparatus used to perform it thereof.

Without being bound to a specific mechanism of action of the oxyphilic solution, one may hypothesize that upon heating, the oxyphilic solution is vaporized and as the volume of water (steam) vapor and other components (e.g., alcohol) is expanding, the pressure inside the closed space rises. One may also hypothesize that water and alcohol molecules may interact with $O_2$ and may help the evacuation of oxygen from the reactor. Throughout the process, the pressure inside the drum may be regulated by evacuating air to atmosphere.

The gas and oxyphilic vapor are evacuated from the drum. The oxyphilic vapor may be condensed in a condenser and the gas may be partially flared and/or directed to atmosphere; the condensed vapor (including water and oxyphilic soultion) may be recuperated. The condensed vapor may comprise for example, water, alcohol and small chain hydrocarbons (e.g., hydrocarbons having 6 or 7 carbon atoms). One of the inventive aspects of the improved batch process described herein is that the condensed vapor may be recycled to generate the oxyphilic solution for the following batch process. This minimizes the cost and the potential harm to the environment associated with discharge. In order to generate the oxyphilic solution, the composition of the condensed vapor solution may be adjusted to a desired content with, for example, water, alcohol (water miscible alcohol; e.g., ethanol, isopropanol, n-butanol, isobutanol, and mixtures thereof) and nonionic surfactant, such as for example, Tween® 80 (which does not vaporize at 100° C.) in order to generate the oxyphilic solution.

A minor disadvantage of the present method, is that slightly more time is required to process a batch of fragmented rubber material compared to methods relying on vacuum pumps and devices. Indeed, while it took approximately 15 minutes to create an almost complete vacuum inside a drum of the above-mentioned dimensions (diameter of 8 feet, length of 20 feet), it takes approximately 20 minutes to perform a substance purge (to vaporize forty to fifty imperial gallons of solution) inside the drum. However, considering the economy in the vacuum pump, seals, and electricity and the potential risk that is avoided, the method of the present invention remains very advantageous over previously used methods.

As used herein, the term "substance purge" relates to the use of a purge substance being able to increase the pressure inside a container (under appropriate conditions such as, for example, heating up to the boiling point of said substance) helping (or inducing) the evacuation of oxygen from the container through an evacuation (means) component. A "substance purge" more particularly relates to the evacuation (removal) of air (oxygen) from the inside of a closed space using a substance such as, for example, an oxyphilic solution. A "substance purge", as defined herein, may rely, for example, on the ability of a purge substance (e.g., a liquid or solid that may be transformed into a gas) to create a pressure increase inside a closed space (e.g., a reactor) with rise in temperature from ambient (or room temperature) to the predetermined temperature referred to herein, that will help the evacuation of air through an evacuation component. An example of "substance purge" may be for example the removal of oxygen by use of a liquid, such as the oxyphilic solution described herein, which upon heating will be vaporized and will contribute to the increase in pressure that is required to allow the evacuation of air.

As used herein a "purge substance" is a substance that may induce the evacuation of oxygen (a substance purge), out of the interior of the container when the interior of the reactor is heated to a predetermined temperature.

As used herein, the term "oxyphilic solution" relates to a solution which, in its vaporized states helps the evacuation of oxygen from a closed space. An "oxyphilic solution" relates to a solution, which comprise, for example, water (H$_2$O) and/or alcohol (e.g., ethanol, isopropanol, n-butanol, isobutanol). An "oxyphilic solution" as used herein may further comprise other molecules than water or alcohol molecules, such as, for example, small chain hydrocarbons having 6 or 7 carbon atoms and mixtures thereof and/or surfactant (e.g. nonionic surfactant) without its property being affected.

As used herein a "oxygen-free environment" or a "anoxic environment" relates to environment (air contained in a container or reactor) containing negligible quantity of oxygen (less than 0.1% and not exceeding 1% (v/v) of the total air volume) that avoids risks associated with a thermal decomposition process as described herein.

As used herein the terms "oxygen purge" or "purging oxygen" or "oxygen purge step" relates to the removal (evacuation, expelling) of oxygen from the inside of a reactor (drum, reactor chamber) using either mechanical means (e.g., vacuum pumps) or other means such as, for example, the use of a substance purge (using, for example, an oxyphilic solution).

As used herein, the term "small chain hydrocarbon" includes compounds comprising, for example 6 or 7 carbon atoms (C6 or C7). "Small chain hydrocarbon" includes n-alkanes, branched alkanes, cycloalkanes, alkenes such as but without being restricted to hexane, heptane, 2,3-dimethylbutane, tetramethylethylene, etc. It is to be understood herein, that "small chain hydrocarbons" suitable for the oxyphilic solution described herein are small chain hydrocarbons (e.g. C6 or C7 hydrocarbon and mixtures thereof) able to be vaporized at temperatures near/between 100° C. and 120° C. (e.g., water which has a boiling point near 100° C.) and that may be condensed (i.e., condensable) at temperature below 100° C.

It is to be understood herein, that if a "range" or "group" of substances or the like is mentioned with respect to a particular characteristic (e.g. temperature, pressure, time and the like) of the present invention, it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-ranges or sub-groups encompassed therein; and similarly with respect to any sub-ranges or sub-groups therein. Unless otherwise indicated, percentages (%) are expressed on a basis of volume/volume (v/v).

with respect to a pressure range of 1 to 35 PSIG, it is to be understood as specifically incorporating herein each and every individual pressure state, as well as sub-range, such as for example 2 PSIG, 5 PSIG, 20 PSIG, 34.5 PSIG, 5 to 8 PSIG, 5 to 35 PSIG, 10 to 25 PSIG, etc.;

with respect to a temperature of at least 100° C., this is to be understood as specifically incorporating herein each and every individual temperature state, as well as sub-range, comprising 100° C. and above 100° C., such as for example 101° C., 105° C. and up, 115° C. and up, 102° C. to 150° C., up to 210° C., and 600° C. etc.;

TABLE 1

| Abbreviation | Meaning |
| --- | --- |
| ° C. | degree Celcius |
| rpm (RPM) | revolution per minute |
| ppm (PPM) | parts per million |
| BTU | British thermal unit |
| lb | pound |
| % | percent |
| mg | milligram |
| kg | kilogram |
| kPa | kiloPascal |
| cSt | Centistoke |
| PSI | Pound per square inch |
| PSIG | Pound per square inch gauge |
| m$^3$ | Cubic meter |
| U.S. | United States |
| ft$^3$ | Cubic feet |

TABLE 1-continued

| Abbreviation | Meaning |
|---|---|
| T.H.C. | Total hydrocarbon content |
| L | liter |

DETAILED DESCRIPTION OF THE INVENTION

Figure 1:
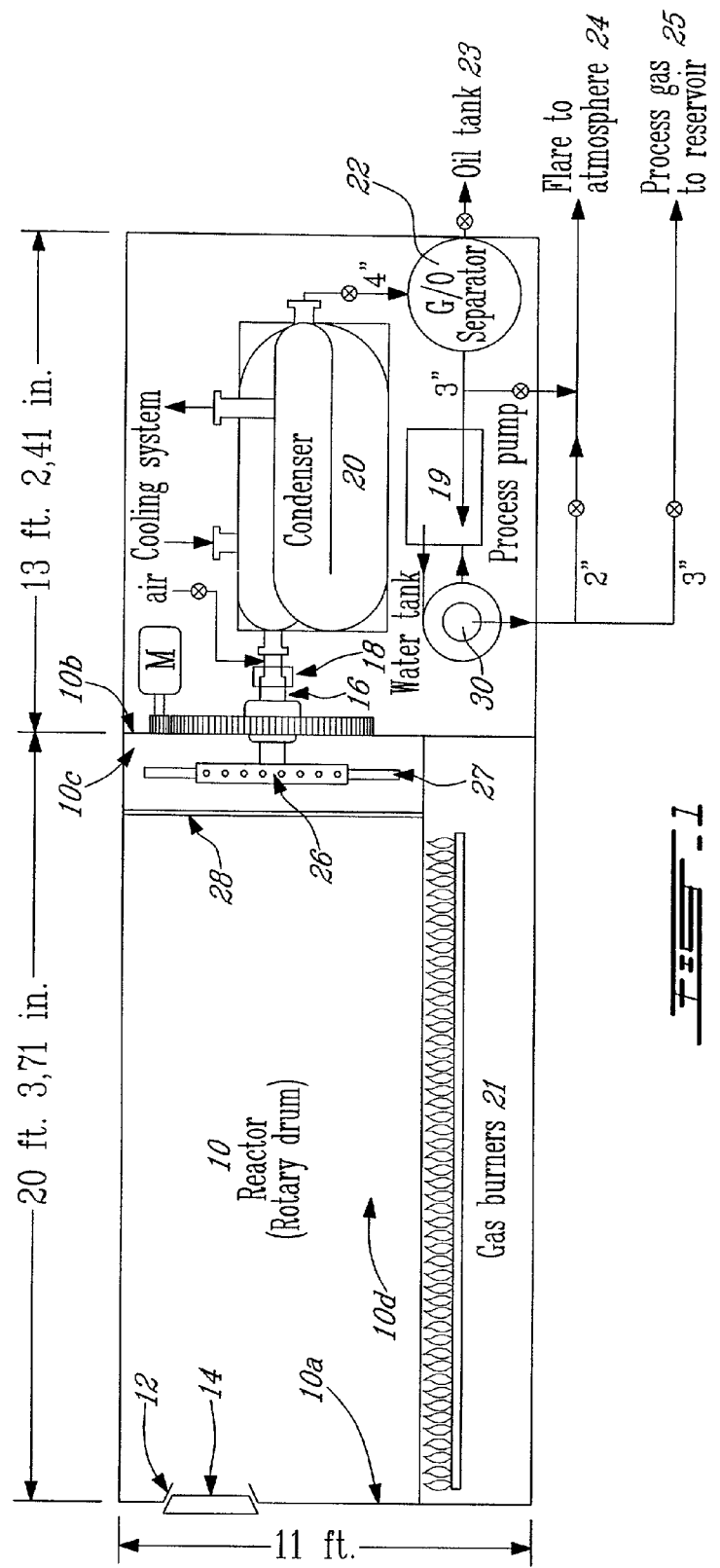
FIG. 1. is a schematic diagram of a thermal decomposition apparatus using an oxyphilic solution to obtain an anoxic atmosphere for carrying out the improved batch process of the invention.

It is the gist of the invention to provide a method of purging oxygen from a sealed container interior without having to create a vacuum and a purge substance used in such method. Such substance purge may be performed by using a purge substance such as, for example, an oxyphilic solution, which upon heating and vaporization, may generate a positive pressure (i.e., above atmospheric pressure) helping the evacuation of oxygen ($O_2$) out of the reactor, through evacuation components. The removal of oxygen is exemplified in an improved batch process described herein and it may be sufficient to allow the thermal decomposition of material in safe conditions.

In a rotary drum, or other enclosure having a diameter of 8 feet and a length of 20 feet (or a similar volume), a volume of approximately 182 to 227 L (40 to 50 imperial gallons) of oxyphilic solution may be used. Such oxyphilic solution may comprise, for example, approximately 50% (v/v; i.e, of the total volume) to 60% (v/v, i.e., of the total volume) of water, 40% (v/v, i.e., of the total volume) of alcohol, such as for example ethanol, isopropanol, n-butanol, and isobutanol and mixture thereof, 20% (v/v, i.e., of the total volume) of small chain hydrocarbons (e.g. C6 to C7 hydrocarbon and mixtures thereof) and 2% (v/v, i.e., of the total volume) of surfactant such as polyethylene-(20) sorbitan-monooleate. The total volume of the oxyphilic solution may be adjusted for a reactor of different size. Vaporization of the solution and removal of oxygen from the reactor may be completed in about 10 to 20 minutes as it is exemplified herein.

Referring to FIG. 1; this FIGURE is an example embodiment showing the flow diagram of a thermal decomposition system (apparatus), used to exhibit the inventive elements of the present invention. More particularly, it can be seen that the apparatus used may comprise; a rotary cylindrical reactor or drum (10), which is rotatably installed inside an insulating sheath (not shown) resting on the ground, as known in the art. The drum (10) defines a front (10a) and a back end walls (10b), and rotates about a horizontal axis. Burners (21) are provided inside the sheath, to heat the exterior of the cylindrical chamber of the rotary drum or kiln (10) to selected controlled temperatures. The drum (10) comprises an opening (12) at its front end (10a), through which batches of material (e.g. fragmented material) to be decomposed may be loaded, more particularly in section (10d) of drum (10). A sealed door (14) closes the opening (12). The drum (10) may have a diameter of 8 feet and a length of 20 feet, or other pre-determined dimensions.

An outlet pipe (16) originates inside the drum (10) and extends through the back wall (10b) of said drum (10). Gas collecting (including an evacuation component), which will be detailed hereinafter, are provided at the inner end of pipe (16), i.e. in the portion of pipe (16) located inside the inner chamber of drum (10). A rotary sealing joint (18) allows a sealed engagement of pipe (16) with drum (10).

The outlet pipe (16) is connected to the flow circuit of the batch process of the invention, comprising elements, which are known in the art, except as noted hereinafter, and which will consequently only be briefly described.

The outlet pipe (16) draws the gas and vapor from inside the chamber of drum (10) with the help of a process pump (19). Pipe (16) is connected to a condenser (20) which brings (condenses) the gas and vapor emanations into their liquid phase (e.g., those of which are condensable under such the conditions described herein). At a temperature ranging from 100° C. to 165° C. a condensed liquid, containing water, alcohol and small chain hydrocarbons such as for example C6 to C7 hydrocarbons is collected separately from the gas and oil. At a temperature around 340° C., an exothermic reaction is initiated generating hydrocarbon vapors which are carried to a phase G/O separator (22) forming gases (non-condensable) and oils (condensable); following separation, the oil is then carried into an oil storage tank (23), and the gases can be flared (24) for obtaining a desired total hydrocarbon content and then stored in a process gas tank (25). The process gas, which has been thus created may be used by the burners (21) to heat the exterior wall of rotary drum (10). The pump (19) may have a pressure range of 1 to 35 PSIG. Cooling of said pump (19) is provided by water tank (30).

The drum (10) according to the invention may comprise, for example, gas collecting means, fluidly connected to the inner end of outlet pipe (16). One of the preferred embodiment of gas collecting means is shown in FIG. 1 as a rotatable collecting unit with filter elements (26) fixed to wall end (10b), on which twelve (12) radially projecting filter elements (27) are provided. These filters have an open end, and are screwed around a manifold flanged to wall (10b) and to outlet pipe (16).

Collecting unit with filter elements (26) is located in section 10c of the reactor chamber of drum (10), parallel to coarse filter wall (28) and its back wall (10b). Filter elements (27) may be provided with suitable micropores of high resistant material therein.

A circular coarse wall filter (28) is fixed radially to the cylindrical inner wall of drum (10) inside the drum chamber, and is located before collecting unit with filter elements (26) and near back wall (10b), so as to define a relatively lengthwise short, diametral rear pocket forming a rear sub-chamber (10c) inside the main reactor chamber of drum (10). Gas collecting unit with filter elements (OMNIfilter®-like filters) (26) is located in pocket (10c). The drum main chamber is thus divided into a small sub-chamber (i.e., rear sub-chamber) (10c), and a large sub-chamber (i.e., front sub-chamber) (10d), extending between filter wall (28) and drum front wall (10a). An opening (12) gives access into a front sub-chamber (10d), where the (fragmented) material to be processes is to be loaded. The purpose of filter (28) is to prevent rubber shreds to reach the rear sub-chamber pocket (10c) and damage filter elements (27) (OMNIfilter®-like filters) around the collective unit with filter elements (26). Only gas and vapor are allowed through filter (28). For example, the filter (28) may comprise several juxtaposed perforated plates, which have a plurality of relatively offset through-holes of a small dimension. For example, three superimposed plates may be used, the first one (facing wall (10a)) with holes of ⅛", the second intermediate one with holes of 1/16", and the third one (facing wall (10b)) with even smaller holes, e.g. 1/32". The plates are configured so that the holes may allow gas to flow through without allowing solid particles to gain access to the rear sub-chamber pocket. Thus, the effective spacing between the holes is designed to block macroparticulate material from passing through, while allowing liquid to seep in and gaseous emanations to pass through.

In accordance with the present invention, the process used to validate the invention includes the step of providing a predetermined volume of an oxyphilic solution inside the rotary drum (10), at the same time as the material to be decomposed is loaded. For example, for a drum having the above-mentioned dimensions, forty to fifty imperial gallons of solution may be inserted in the drum. The solution will vaporize in the drum being heated (at 100° C.) at the beginning of the process. The process pump is not activated at this stage since the pressure inside the reactor (due to the vapor) is above atmospheric pressure. A pressure range within the drum of between 1 and 15 PSIG is maintained and it is necessary to transfer through outlet pipe (16) the vapor (from water and hydrocarbons) from the drum (10) to condenser (20) and gas/liquid (G/O) separator (22).

The purpose of the oxyphilic solution will now become apparent. Indeed, as the solution starts to vaporize, it will effectively contribute to raise the pressure inside the drum that in turn will generate a continuous air and vapor flow into the outlet pipe (16) mainly due by pressure difference. Thus, air (containing oxygen) will be effectively expelled out of the drum (10), into pipe (16).

Forty to fifty imperial gallons of said solution creates approximately 11,000 to 13,500 cubic feet of vapor. A drum with the above-noted dimensions has an inner volume of approximately 1,000 cubic feet. Thus, the total volume of vapor, which originates from the liquid inserted in the drum, is equivalent to approximately eleven to thirteen times the inner volume of the drum. Once all the solution has evaporated, the inner concentration of oxygen will be inferior to approximately 0.1% (of the air content inside the apparatus) and thus a substantially oxygen-free environment is effectively created.

The oxyphilic vapor that is evacuated in pipe (16) will be condensed in the condenser (20) and collected in liquid phase in the separator (22), to be stored in a suitable tank and re-used in the next batch. It must be noted that this liquid collecting means must be present in any event, since a certain quantity of integral water present in tire rubber must be collected anyway. The tank must be larger however, to accommodate larger volumes of water derived from the humidity contained in rubber ±3% (v/v).

Thus, it can be seen that in accordance with the present invention, a substantially anoxic (oxygen-free) environment may be created in a sealed closed space without a vacuum being created therein. Air is eliminated from the drum (10) mainly by pressure difference upon vaporization of water and light hydrocarbons. Without the present invention, a vacuum pump must be utilized and the electricity required to drive such equipment is an additional expense that increases the cost of the process. On the other hand, the energy needed to vaporize the oxyphilic solution of the present invention is provided by the burners, which are fed with the process gas resulting from the thermal decomposition of the material inside the drum. Thus, with this energy source, no outer expense has to be anticipated.

EXAMPLE 1

The following result, illustrated in Table 2 is an example of the method disclosed herein, using the apparatus illustrated in FIG. 1. As a blank experiment, a volume of between 40 and 50 imperial gallons of freshly prepared oxyphilic solution was introduced in the drum (10). The drum was subsequently sealed. The temperature inside the drum (10) was raised and maintained at 100° C. Concentration of oxygen inside the drum was followed by a continuous analyzer using a chemical cell. Column 2 illustrates the volume of air (containing approximately 20.9% of $O_2$ of the total air content (i.e., in percent by volume at 15° C. and 101.3 kPa) initially contained in the reactor that is gradually replaced by the volume occupied by the vaporized oxyphilic solution, as seen in column 3. As may be seen, from this example (Table 2), after 12.4 minutes, the volume of air containing $O_2$ is negligible (0.147 cubic feet ($ft^3$)). It may take less than 15 minutes to completely replace air with the vaporized oxyphilic solution using the conditions described above. Such conditions are considered extremely safe since the interior of the reactor contains only steam (water vapor) and hydrocarbon vapors (originating from the oxyphilic solution). The operation results in a positive pressure inside the reactor, thus preventing air infiltration.

TABLE 2

| 1 Time (Minutes) | 2 Volume of air ($ft^3$) (20.9% $O_2$) inside the reactor | 3 Volume of vaporized oxyphilic solution ($ft^3$) inside the reactor | 4 Volume of air ($ft^3$) evacuated from reactor/volume of vaporized oxyphilic solution ($ft^3$) |
|---|---|---|---|
| 0 | 1000 | 0 | 0 |
| 1 | 500 | 500 | 500/500 |
| 2 | 250 | 500 | 250/250 |
| 3 | 125 | 875 | 125/875 |
| 4 | 62.5 | 937.5 | 62.5/938 |
| 5 | 31.3 | 968.7 | 31.3/969 |
| 6 | 15.65 | 984.4 | 15.65/984 |
| 7 | 7.83 | 992.2 | 7.83/992 |
| 8 | 3.91 | 996.1 | 3.91/996 |
| 9 | 1.95 | 998.0 | 1.95/998 |
| 10 | 0.975 | 999.0 | 0.98/999.0 |
| 11 | 0.49 | 999.5 | 0.49/999.5 |
| 12 | 0.245 | 999.7 | 0.25/999.7 |
| 12.4 (final) | 0.147 | 999.85 | 0.15/999.9 |

EXAMPLE 2

The following is an example of an improved batch process based on the process described in U.S. Pat. No. 5,821,396, wherein an oxygen-free environment is generated using the method and oxyphilic solution described herein.

A drum (10) of 20 feet in length and 8 feet in diameter was used. Six tons (12 000 pounds) of used rubber tires which is equivalent to about 600 tires were first cut up in pieces of about 2"×2" and loaded as tire cuttings into the stationary reactor drum with the reactor access door (14) at 12:00 o'clock. Forty-five (imperial) gallons of the oxyphilic solution containing water (56% (v/v) of total volume), alcohol (36% (v/v) of the total volume), small chain hydrocarbons (comprising a mixture of C6 and C7 hydrocarbons; 7% (v/v) of the total volume)) and polyethylene-(20)-sorbitan-monooleate (0.2 L, i.e., less than 1% (v/v) of the total volume) was added inside the reactor. The door was closed in an airtight manner. The drum was then driven at low speed of 0.75 RPM at a temperature of 100° C. and higher. At this step the oxyphilic solution becomes vapor, which gathers air contained in drum (which may be partially due to molecular interaction between water/alcohol and $O_2$) and through expansion, carry air out of the drum. The burner (21) was started using propane gas from a reservoir at the start of first batching operation. Heating was carried out at about 50% of the burner capacity for 10 minutes then 90% of the burner capacity for the consecutive 35 minutes. At this time evaporation of the oxyphilic solution was starting to take place which then draw air and oxygen outside the drum, thus creating the required anoxic environment. This is followed by an exothermic reaction starting at about 225° C. whereby heating was lowered to 10% of burner capacity and valve was closed to thus positively prevent secondary cracking reaction and to allow reactor internal pressure to increase by the production of process gases and vapors which started to be discharged through condenser (20) and separated in G/O separator (22) with oil going to reservoir (23) and the process gases to reservoir (25). Process gases with a carbon content of lower then 35% (35% total carbon content (T.H.C.)) as measured by the relevant sensor were first directed to flare (58) by opening a solenoid valve and when analyzed to a 35% T.H.C. (35% total carbon content) were directed to a reservoir. When sufficient process gas has accumulated within reservoir as indicated by the pressure sensor, liquid ring pump was started. The process gases were fed to the burner (21) and the burner was modulated between 10% and full capacity by a motorized butterfly valve as controlled from the computer.

The pressure inside the drum (reactor) (10) was regulated between 760 and 1277 mm of mercury, so as to obtain maximum output of oil relative to the output of the process gas. To do so, reactor rotation and heating were modulated and only at the end of batch operation when gas output started to decrease, was it necessary to start liquid ring pump. The temperature at the inlet of the condenser (20) as determined by temperature sensor varied during the entire batch processing operation between 400° C. and 496° C., while the temperature at the outlet of the condenser (20) as determined by another temperature sensor was varied between 40° C. and 52° C.

These pressure and temperature conditions and also the low drum rotational speed were kept until the total hydrocarbon content of the separated process gases became less than 50% (50% total carbon content (T.H.C.)) at which time drum rotation was increased from 0.75 RPM to about 8 RPM for about 4 minutes and the speed was lowered again to 0.75 RPM, this cycle was repeated three times. Due to the rapid stirring, solid residual material in the drum started to emit process gas again. At the end of the third stirring cycle, flare stopped when the total carbon content of the process dropped to about 1 to 2% (T.H.C.).

During the entire batching operation, effluent gases from the burner (21) were monitored as to their composition by the sensors and chimney butterfly valve and combustion air fan were consequently modulated so as to discharge to the atmosphere environmentally acceptable combustion gases.

The drum was stopped with its door at 12 h00, the door (14) was opened and replaced by a dummy door. The drum (10) was then rotated to a position with the dummy door at 6 h00, the dummy door was removed and the suction tube of a vacuum cleaner was held at about 18 inches from the door so as to prevent escape to the atmosphere of any powder in the drum. The suction tube, about 26 feet in length, was inserted within the drum and moved longitudinally of the drum to suck out the solid residues namely carbon black powder and wire mesh which were sent to a separator so that the carbon black powder was recuperated. Steel wire mesh from the rubber tires were also recuperated.

Total batching time for processing 12,000 pounds of tires took approximately three hours and twenty minutes.

The following components were obtained expressed as a function of the percentage of the total weight of tires which were processed: 47% light oil which is equivalent to about 1.3 U.S. gallon per tire, process gas 11%, carbon black 32% and steel 10%. The carbon black was of quality to be sold for use, for instance as dry ink in photocopying machines, filtering agent, tire fabrication, paint and dye colorant, synthetic marble and plastic.

Oil analysis: An oil sample was supplied to a commercial laboratory and the following data was obtained: Density at 15° C.: 918.3 kg/m3; calorific value 1767.2 BTU/lb.; ketone index 34.5; viscosity at 40° C. 3.94 cSt; ashes 0.011% m. The oil was submitted to distillation; the initial boiling point was 64° C., 10% of the oil was recuperated at 137° C., 20% at 178° C., 30% at 220° C., 40% at 259° C., 50% at 299° C., 60% at 331° C., 70% at 358° C. and 90% was recuperated at 399° C. Cracking occurred at 92% of recuperation at 402° C., the flash point was 22° C., X-ray analysis showed a sulfur content of 0.53% m and a total halogen content of 713 ppm.

The carbon black obtained was also analyzed for impurities with the following results; arsenic 1.71 mg/kg; cadmium 4.60 mg/kg; chlorides 2210 mg/kg, chrome 9.50 mg/kg; mercury less than 0.05 mg/kg; nickel 11.5 mg/kg; lead 144 mg/kg, sulfur 30 g/kg and zinc 48500 mg/kg. When burnt at 800° C., there was a carbon black loss of 83.9% of the carbon black sample.

It was found that 10 to 15% of the process gas obtained could be sold as fuel gas, being in excess to the process gas required for heating the reactor during the batch processing operation. The used tire recycling process in no way contaminated the atmosphere surrounding the reactor as it was found very easy to prevent escape of carbon black during reactor unloading.

It should be noted that propane gas is used as a source for the burners only at the start of the first batch operation since sufficient process gas is accumulated in reservoir during the first batching operation for the start of the second and the subsequent batch operations.

It was also found that four reactors (10) including chimney, burner (21) and immediate accessories could be installed in parallel to discharge gas to single processing equipment including the condenser (20) separator (22), reservoir, pumps and other associated equipment so as to practically double the capacity of the installation.

The excess process gas in addition to that required for heating the reactor could be used as a fuel, for instance, for steam production.

The invention claimed is:

1. In a batch process for the thermal decomposition of a hydrocarbon containing material in a sealed reactor interior, said reactor being provided with a gas evacuation component, said process comprising the steps of:
   a) loading the hydrocarbon containing material into and sealing the reactor;
   b) purging oxygen from said reactor; and
   c) heating said reactor to a predetermined temperature so as to obtain decomposition products,
      the improvement wherein the purging step includes loading the reactor with an oxyphilic solution prior to sealing the reactor and heating the interior of the sealed reactor to a first predetermined temperature to induce the oxyphilic solution to drive oxygen out of the interior of the container through said gas evacuation component, said oxyphilic solution comprising a proportion of 10 moles of water ($H_2O$) and 4 moles of an alcohol selected from the group consisting of ethanol, isopropanol, n-butanol, and isobutanol, and mixtures thereof for each 4 moles of gaseous oxygen ($O_2$) present in said reactor.

2. In a batch process as defined in claim 1, wherein said process includes recovering said decomposition product.

3. In a batch process as defined in claim 1, wherein said first predetermined temperature is at least 100° C.

4. In a batch process as defined in claim 1, wherein said oxyphilic solution further comprises 20% (v/v) or less of a small chain hydrocarbon selected from the group consisting of a hydrocarbon having 6, and 7 carbon atoms, and mixtures thereof, and 2% (v/v) or less of nonionic surfactant.

5. In a batch process as defined in claim 1, wherein said hydrocarbon containing material is selected from the group consisting of a vehicle tire, a rubber material, a vinyl polymer, a styrene polymer, an ethylene polymer, a synthetic fiber, a domestic waste, an animal waste, a biomedical waste, a vegetation, and mixtures thereof.

6. In a batch process for the thermal decomposition of a hydrocarbon containing material in a sealed reactor interior, said reactor being provided with a gas evacuation component, said process comprising the steps of:
   a) loading the hydrocarbon containing material into and sealing the reactor;
   b) purging oxygen from said reactor; and
   c) heating said reactor to a predetermined temperature so as to obtain decomposition products,
      the improvement wherein the purging step includes loading the reactor with an oxyphilic solution prior to sealing the reactor and heating the interior of the sealed reactor to a first predetermined temperature to induce the oxyphilic solution to drive oxygen out of the interior of the container through said gas evacuation component, wherein said oxyphilic solution comprises;
   a) water;
   b) an alcohol selected from the group consisting of ethanol, isopropanol, n-butanol, and isobutanol, and mixtures thereof;
   c) a small chain hydrocarbon selected from the group consisting of a hydrocarbon having 6, and 7 carbon atoms, and mixtures thereof and;
   d) a nonionic surfactant.

7. In a batch process as defined in claim 6, wherein water is in a proportion of between 50 to 60% (v/v).

8. In a batch process as defined in claim 6, wherein said alcohol is in a proportion of between 30 to 40% (v/v).

9. In a batch process as defined in claim 6, wherein said small chain hydrocarbon is in a proportion of between 0 to 20% (v/v).

10. In a batch process as defined in claim 6, wherein said nonionic surfactant is in a proportion of between 0 to 2% (v/v).

11. The process of claim 6, wherein said nonionic surfactant is polyethylene-(20) sorbitan-monooleate.

12. A method for purging oxygen from the interior of an apparatus for the thermal decomposition of hydrocarbon containing material, the apparatus being associated with a gas evacuation component, said method comprising heating the interior of the apparatus containing an oxyphilic solution to a predetermined temperature to induce the oxyphilic solution to drive oxygen out of the interior of the apparatus through said gas evacuation component, wherein said oxyphilic solution comprises a proportion of 10 moles of water ($H_2O$) and 4 moles of an alcohol selected from the group consisting of ethanol, isopropanol, n-butanol, and isobutanol, and mixtures thereof, for each 4 moles of gaseous oxygen ($O_2$) present in said reactor.

13. The method of claim 12, further comprising the step of collecting gas that is evacuated through said gas evacuation component.

14. The method of claim 12, wherein said apparatus is a reactor.

15. The method of claim 12, wherein said predetermined temperature is at least 100° C.

16. The method of claim 12, wherein said oxyphilic solution further comprises 20% (v/v) or less of a small chain hydrocarbon selected from the group consisting of a hydrocarbon having 6 and 7 carbon atoms and mixtures thereof, and 2% (v/v) or less of a nonionic surfactant.

17. A method for purging oxygen from the interior of an apparatus for the thermal decomposition of hydrocarbon containing material, the apparatus being associated with a gas evacuation component, said method comprising heating the interior of the apparatus containing an oxyphilic solution to a predetermined temperature to induce the oxyphilic solution to drive oxygen out of the interior of the apparatus through said gas evacuation component, wherein said oxyphilic solution comprises;
   a) water;
   b) an alcohol selected from the group consisting of ethanol, isopropanol, n-butanol, and isobutanol, and mixtures thereof;
   c) a small chain hydrocarbon selected from the group consisting of a hydrocarbon having 6, and 7 carbon atoms, and mixtures thereof and;
   d) a nonionic surfactant.

18. The method of claim 17, wherein water is in a proportion of between 50 to 60% (v/v).

19. The method of claim 17, wherein said alcohol is in a proportion of between 30 to 40% (v/v).

20. The method of claim 17, wherein said small chain hydrocarbon is in a proportion of between 0 to 20% (v/v).

21. The method of claim 17, wherein said nonionic surfactant is in a proportion of between 0 to 2% (v/v).

22. The method of claim 17, wherein said nonionic surfactant is polyethylene-(20) sorbitan-monooleate.

* * * * *